United States Patent Office 3,519,808
Patented July 7, 1970

3,519,808
TESTING AND REPAIR OF ELECTRONIC
DIGITAL COMPUTERS
Robert Ernest Lawder, Halstead, near Sevenoaks, England, assignor to The Secretary of State for Defence in Her Britannic Majesty's Government of the United Kingdom of Great Britain and Northern Ireland, London, England
Filed Mar. 21, 1967, Ser. No. 624,931
Claims priority, application Great Britain, Mar. 25, 1966, 13,231/66
Int. Cl. G06f 11/00, 11/04
U.S. Cl. 235—153
20 Claims

ABSTRACT OF THE DISCLOSURE

A procedure is described for rapidly locating any faulty parts in an electronic digital computer of a type having a control section, a registers section and a memory section and having microprogramming parts in its control section. By making certain disconnections within the computer, the test procedure is greatly simplified and can be performed with comparatively simple external testing equipment.

---

The present invention relates to methods for the testing and repair of electronic digital computers. The major difficulty in testing and repairing digital computers is to detect and locate faults which may occur in any part of a very large and complex network of interacting components; that is to identify the source or sources of the faults. Most computers have so many components or circuit boards that to test them individually would be an intolerably tedious and expensive task. It is desirable to test the computer components in their normal position and with their normal interconnections, as a fault may be produced by the interaction of one component or unit upon another, or by environmental effects such as temperature, vibration, or the proximity of various parts. However, in their normal position many of the interconnections within the computer are not readily accessible, and with the normal interconnections the parts interact in so many ways that it is usually very difficult to determine the source of the fault.

A known method for testing and fault location in a computer is to prepare and use a diagnostic programme; that is to make the computer perform a series of calculations which have been especially devised so that the answers obtained may indicate possible sources of error. However, since every calculation will involve a sequence of actions in a chain of interacting components, it is practically impossible to devise a diagnostic programme which will infallibly indicate the source of every possible fault with sufficient precision to allow the faulty component to be located in a reasonably short time. Moreover, a fault may have the effect of corrupting the signals of the programme when it is being fed into the computer, so that it may produce answers spuriously indicating errors which do not exist, or fail to indicate errors which it ought to show. To devise a useful diagnostic programme requires skill, thought and patience. Diagnostic programmes are therefore expensive to develop and not always sufficient in themselves as a means for testing and fault location.

According to the present invention in one aspect thereof, there is provided a method of testing an electronic digital computer of a type having a control section provided with microprogramming parts, a registers section and a memory section, to detect the presence of and locate the sources of faults in the operation of the computer, which method includes the steps of substantially disconnecting at least the microprogramming parts of the control section from the registers section and from the memory section of the computer or otherwise rendering the microprogramming parts of the computer temporarily inoperative; feeding to the registers section a sequence of signals devised to exercise all important normal actions of the parts of the registers section in such a sequence that already tested parts are used in testing further parts, and so that the correctness of each action or of each of a plurality of short sequences of actions may be verified; and then testing the storage locations of the memory section for their ability to receive and reproduce number signals correctly. The storage locations may be tested by connecting the registers section to the memory section and applying a sequence of signals to control lines controlling actions of the registers section and memory section, which sequence of signals firstly causes the storage locations to be filled with a first pattern of ones and zeros, secondly causes the contents of these storage locations to be read out and checked to confirm whether or not the digits read out agree with the first pattern fed in, thirdly causes the storage locations to be refilled with a second pattern of ones and zeroes which is complementary to the first pattern, and fourthly causes the contents of the storage locations to be again read out and checked to confirm whether or not the digits read out agree with the second pattern fed in.

A further test may be performed in which instruction-modifying output lines of the registers section, which are normally connected to the control section, are temporarily connected to data input lines of the registers section, and a sequence of signals is applied to the registers section to cause instruction-modifying signals to be set up on at least some of the output lines and then transmitted through the data input lines to a part of the registers section where their correctness is verified.

Still further tests may involve feeding a sequence of instruction signals to the control section and checking whether or not each instruction signal fed to the control section causes it to emit a corresponding sequence of control signals. The control signals may be checked at each step of the sequence or alternatively they may be cumulatively added together in the registers section to form a total as if they represented multi-digit binary numbers in parallel form, and the correctness of the total checked at chosen stages of the tests.

The filling of the storage locations, and the reading out and checking of their contents, are preferably accomplished by cyclic operations in the registers section under the control of a testing apparatus. The checking processes may be performed by adding the digits actually produced to the complement of the number which these digits should form in the absence of any faults, and detecting any error by occurrence of a zero in the sum so formed. The detection of an error may be arranged to stop the checking process so that the location of the error may be found by inspecting the contents of the registers.

According to the present invention in another aspect thereof, there is provided a method for repairing a faulty or damaged electronic digital computer in which faulty parts are located by a method as hereinbefore described, wherein the steps of the method are performed in the order claimed and every faulty part is repaired or replaced when it is located and before proceeding to the next step of the method. The method of repair may for instance include the steps of substantially disconnecting at least the microprogramming part of the control section from the registers section and from the memory section of the computer, or otherwise rendering the microprogramming part of the computer temporarily inoperative; locating the sources of any faults within the registers section by feeding to it a sequence of signals devised to exercise all important normal actions of the parts of the registers section in such a sequence that already tested parts are used in testing further parts and so that the correctness of each action or of each of a plurality of short sequences of actions may be verified; repairing or replacing all faulty parts thus revealed within the registers section; then connecting the registers section to the memory section and applying a sequence of signals thereto to test the storage locations of the memory section for their ability to receive and reproduce number signals correctly and repairing or replacing all faulty parts thereby revealed within the memory section.

The method of repair may also include the further steps of feeding a sequence of instruction signals to the control section, and checking whether or not each instruction signal causes the control section to emit a corresponding sequence of control signals, any discrepancy between the sequence of control signals actually produced and the sequence which corresponds to the instruction given providing an indication of the location of a fault; and repairing or replacing all faulty components thereby revealed within the control section.

According to the present invention in yet another aspect thereof, there is provided testing apparatus for providing sequences of signals for testing an electronic digital computer by a method as described hereinabove. The apparatus may include instruction selector means for setting up a chosen set of instruction signals for application to the computer, instruction loader means for producing a sequence of signals for application to the computer to cause the chosen set of instruction signals to be entered in an instruction register of the computer and to make the computer responsive thereto, and a test sequence control means for producing a sequence of signals for application to the computer to cause sets of signals produced on control output lines of its microprogramming parts to be transferred through data input lines to a register within the computer. The test sequence control means may also produce signals to cause successive sets of signals from the control output lines to be cumulatively added together as though they represented multi-digit binary numbers in parallel form.

Throughout this specification the term "registers section" is used to denote those parts of the computer including temporary storage locations (hereinafter called "registers"), adding devices, and gates for transferring signals between the registers and the adding devices and to and from input and output lines. Thus the registers section is that part of the computer in which most of the arithmetical computation is carried out; in many computers it is commonly known as the arithmetic unit, although it may not be a physically separate unit.

The term "memory section" is used to denote the larger arrays of storage locations in which data and programme instructions are stored for comparatively longer times, together with their input and output arrangements.

The term "control section" is used to denote input code translation facilities, data and programme input control facilities, instruction-modifying, time-sharing and programme interrupting arrangements.

The "microprogramming parts" of the control section refers to devices within the control section which are arranged to respond to various instruction code signals by producing corresponding sequences of control signals for controlling operative parts of the computer to make them perform desired sequences of actions.

It is an important principle of the invention that substantially all of the normal connections between the microprogramming parts of the control section and the registers section are broken or rendered inoperative so that the registers sections can be tested separately, and so that the tests of the registers section and the memory section will not be excessively complicated by any need to allow for possible effects due to faults which may occur in the operation of the control section.

It is another important principle of the invention that the sequence of tests is arranged so that parts of the computer which have been tested are then utilised to facilitate the tests on other parts of the computer.

By using these principles, the processes of testing and fault location can be accomplished comparatively quickly. For instance, in one particular application it is considered possible to perform a complete test within a matter of minutes, whereas fault detection by the methods previously used has been known to take four or five days. For high speed testing, telemetry switches or electronic switching circuits should be used in conjunction with automatic fault detection devices.

In many computers, control output signals from the microprogramming parts of the computer are passed through a set of gates which are controlled by timing waveforms. When testing such computers, the tests may be made more realistic and therefore more reliable if the specified disconnections are made between the microprogramming parts and the set of gates, the sequences of signals fed in during the testing processes are fed to the inputs of the set of gates, and the timing waveforms of the computer are allowed to control the set of gates as in the normal operation of the computer. This ensures that the operative parts of the computer are tested under their normal operating conditions, and that faults in the timing waveforms are detected.

The invention will now be more fully described, by way of example only, with reference to particular forms thereof and with reference to the accompanying drawings of which:

Corresponding parts are given the same or similar reference in all of the figures. Thick lines represent connections capable of carrying a plurality of binary signals. In the present embodiment the signals are carried in parallel form. Arrowheads are used to denote the direction of signal flow. In most of the connections, devices are provided to prevent signal flow in the reverse direction, but these are not shown in order to simplify and clarify the drawings. Persons skilled in the art will perceive that such devices are necessary in a number of places.

Figure 1:
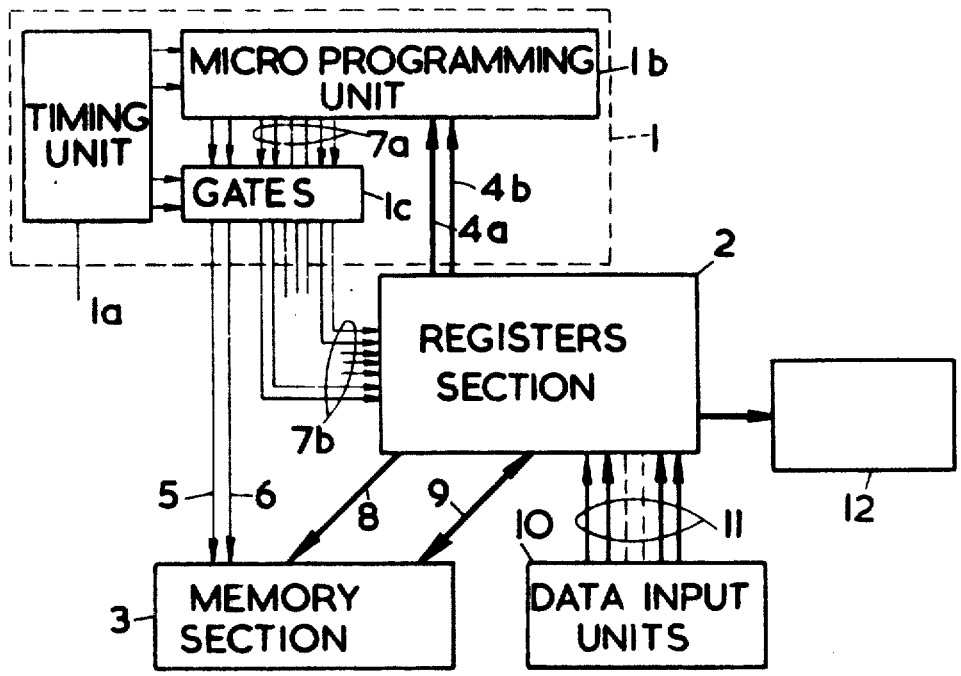
FIG. 1 is a schematic block diagram of an electronic digital computer.

FIG. 1 shows a digital computer comprising a control section 1, a registers section 2 and a memory section 3. The control section 1 includes a timing unit 1a, a microprogramming unit 1b and a set of gates 1c. Outputs of the timing unit 1a are connected to controlling inputs of the microprogramming unit 1b and of the gates 1c. Links 4a and 4b are provided, to carry instruction signals and instruction-modifying signals respectively from the registers section 2 to the microprogramming unit 1b. Control lines 5 and 6 carry control signals from the microprogramming unit 1b through two gates of the set 1c to the memory section 3. A set 7a of control output lines issuing from the microprogramming unit 1b is connected through gates of the set 1c to a set 7b of control input lines entering the registers section 2. A link 8 is provided to carry storage location address signals from the registers section 2 to the memory section 3. A link 9 is provided to carry data signals between the registers section 2 and the memory section 3. Also shown schematically are data input units 10, connected to the registers section 2 by data input links 11, and a peripheral device 12 which is connected to respond to the contents of one of the registers of the registers section 2. The peripheral device 12 may include a monitor display.

Many modern digital computers can be regarded as being formed of functional sections as in FIG. 1 and similarly interconnected, although the sections may not be physically separated. In some cases a monitor display may be provided as a part of the registers section 2 or as a part of the control section 1. The microprogramming unit 1b may for instance include ferrite cores or a matrix of diodes.

Figure 2:
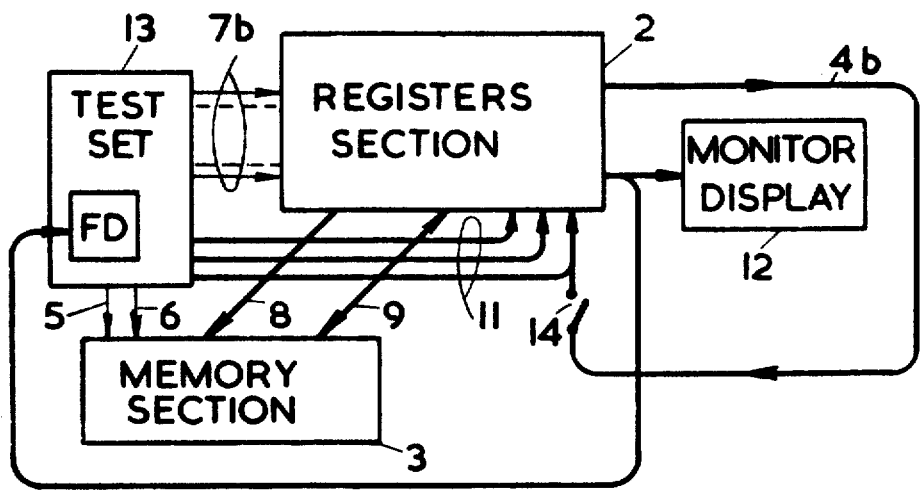
FIG. 2 is a schematic block diagram of a test set connected to the registers section and the memory section of the computer of FIG. 1.

FIG. 2 shows the test set 13 with control outputs connected by lines 5 and 6 to the memory section 3, further control outputs connected to the control input lines 7b of the registers section 2, and with test signal outputs connected to the data input links 11 of the registers section 2. The link 8 is connected to carry storage location address signals from the registers section 2 to the memory section 3. The link 9 is connected to carry data signals between the registers section 2 and the memory section 3. The output from the registers section 2 to a monitor display 12 is also connected to a fault detector FD within the test set 13. The link 4b is connected through a multipole switch 14 to some of the input channels of the data input links 11.

To test the registers section the multipole switch 14 is left open-circuit and the test set 13 is operated to apply a test signal, which may for instance be all ones or all zeroes, to one of the data links 11 and then apply a sequence of signals to the control input lines 7b to cause the test signal to be transferred along a path within the registers section 2 and into a register whose contents are shown by the monitor display 12. By inspection of the monitor display 12, it may be checked whether or not the test signal has been corrupted in following the path. The test should then be repeated with the test signal complementary to the first test signal; when both test signals have arrived uncorrupted, this implies that the actions involved in the path concerned have been satisfactorily performed. The test set 13 is operated to perform a plurality of such tests, applying different sequences of control input signals to the control input lines 7b to transfer test signals along different paths within the registers section 2 until the correct operation of the actions of the registers section has been verified. A deliberate modifications of the test signal will be involved in some of the tests, for instance in the tests of adding actions.

To test the action of the arrangements for transmitting instruction-modifying signals from the registers section 2 to the control section 1 via the link 4b, the switch 14 is closed to connect the channels of the link 4b to digit positions in a register of the registers section 2 which are not involved in the generation or transmission of the instruction-modifying signals. The test set 13 is then operated to apply a sequence of test signals which should set up signals on all the instruction-modifying signal lines of the link 4b, and to transfer such signals through the data input lines 11 and into the register whose contents are shown by the monitor display 12. By inspection of the monitor display 12 the transmission of the instruction-modifying signals may be checked. It may be impossible to set up all the instruction-modifying signals simultaneously, in which case it may be necessary to check them in two or more stages, but this is only a trivial modification. The lines 5, 6, the links 8 and 9 and the memory section 3 are not used in the above-described tests of the registers section 2.

When any faulty parts in the registers section 2 have been located and replaced, and when the correctness of its operations have been verified, it is used to test the memory section 3. For testing the memory section 3, the test set 13 is arranged to provide two complementary test signals of alternate ones and zeroes. These test signals 1010 . . . 10 and 0101 . . . 01 will hereinafter be referred to as Ch 1 (for chequers 1 leading) and Ch 0 (for chequers 0 leading) respectively. A sequence of control signals is applied from the test set 13 to the control line 5 and the control input lines 7b, so as to set up a storage location address signal 000 . . . 000 on the link 8, to clear the storage location 000 . . . 000 of any former contents, and to transfer the test signal Ch 1 through the registers section 2 and via the link 9 to the storage location 000 . . . 000. This is followed by a further sequence of control signals to add one to the storage location address signal, to clear the next storage location 000 . . . 001 of any former contents and then to transfer the test signal Ch 0 through the registers section 2 and via the link 9 to the next storage location 00 . . . 01. Such sequences of control signals are repeated until the memory section 3 is filled with a first pattern of alternate ones and zeroes formed by the insertion of the test signals Ch 1 and Ch 0 respectively in the even-numbered and the odd-numbered storage locations. The first pattern is then checked by further operation of the test set 13 to apply a sequence of signals to the control lines 6 and 7b which cause the storage location address signal on the line 8 to be reset to 000 . . . 000, then cause the contents of store location 000 . . . 000 to be read out via the link 9 and to be added to the test signal Ch 0, and then cause the resultant sum to be entered in a register associated with the monitor display 12. This resultant sum is therefore applied to the fault detector FD; if the circuits associated with storage location 000 . . . 000 have operated correctly, it should be all ones. The fault detector FD is arranged to detect any zero digit in the number signal applied to it. Any zero digit which did occur would indicate a fault; for instance a zero in the third digit position would indicate a fault in the operation of one of the circuits associated with the third digit position in storage location 000 . . . 000. If no such fault is found, the operation of the test set is continued to provide control signals causing one to be added to the storage location address signal on link 8, the contents of storage location 000 . . . 001 to be read out via the link 9 and added to the test signal Ch 1 and then causing the resultant sum to be applied to the monitor display 12 and the fault detector FD. As before, the occurrence of a zero digit in this resultant sum indicates a fault, associated this time with the storage location 000 . . . 001. Such sequences are repeated until all the storage locations of the memory section 3 have been checked. It is arranged that the monitor display 12 will show the storage location signal on the link 8 as well as the resultant sum in each case, and the fault detector FD is arranged to interrupt the testing sequence if a fault is detected.

The whole procedure is then repeated, loading the storage locations of the memory section 3 with a second pattern formed by inserting the test signals Ch 0 and Ch 1 respectively in the even-numbered and the odd-numbered storage locations, and then checking the pattern. The use of the registers section 2 allows a large number of storage locations to be checked in a comparatively short time.

When the registers section 2 has been checked, and repaired if necessary, it is used to expedite tests on the control section 1. An arrangement for testing the control section 1 with provision for automatic fault detection is shown in FIG. 3.

Figure 3:
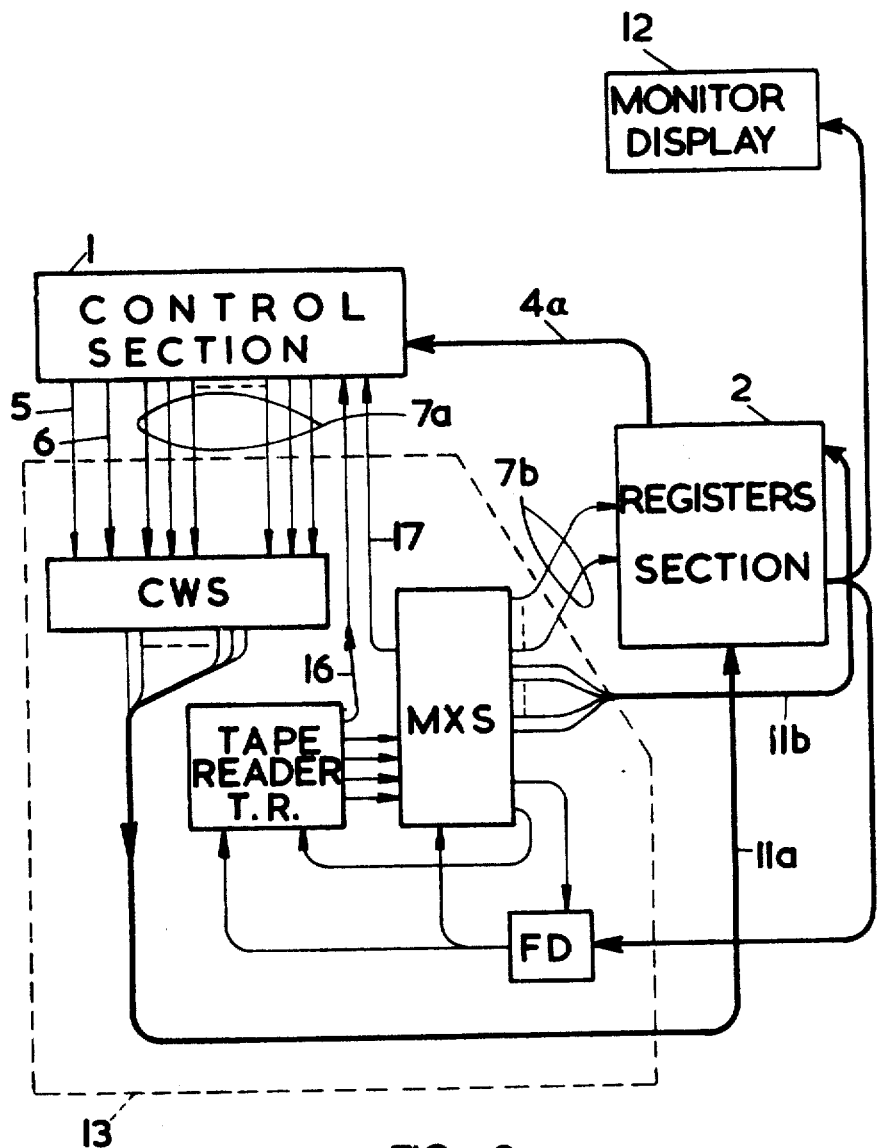
FIG. 3 is a schematic block diagram of a test set connected to the registers section and the control section of the computer of FIG. 1, wherein some details of interconnections within the test set are schematically shown.

FIG. 3 shows the control section 1 with its control output lines 5, 6 and 7a connected to inputs of a switch CWS which is a part of the test set 13. Outputs from the switch CWS are connected to a data input link 11a of the registers section 2. Within the test set 13 there is also a tape reader TR, a multiplexing switch MXS and a fault detector FD. The tape reader TR has four outputs connected to inputs of the multiplexing switch MXS and one output connected by a line 16 to a "control stop" input of the control section 1 of the computer. The multiplexing switch MXS has some outputs connected to some of the control input lines 7b of the registers section 2, some outputs connected to a data input link 11b of the registers section 2, an output connected to the fault detector FD, an output connected to the drive mechanism of the tape reader TR and an output connected by a line 17 to a restarting input of the control section 1. The registers section 2 has an output connected to the monitor display 12 and to the fault detector FD. The fault detector FD has an output controlling power supply connections (not shown) to the tape reader TR and to the multiplexing switch MXS. The link 4a is also connected to carry instructions from the registers section 2 to the control section 1.

In testing the control section 1, the control signals which it produces on the lines 5, 6 and 7a are treated as representing digits in a series of binary numbers in parallel form, each of the lines 5 and 6 and each of the lines of the set 7a being associated with a different digit position and the ones in each number corresponding to lines which are energized. Each instruction code fed to the control section 1 should cause it to emit a sequence of signals corresponding to a different series of numbers hereinafter called an instruction number series. In the embodiment herein described, the control section 1 has thirty-one outputs which are tested in two batches. A first punched tape is prepared for testing the first batch of outputs, and a second punched tape is prepared for testing the second batch of outputs. The switch CWS has two positions for connecting either the first batch or the second batch of outputs to the data link 11a. The first punched tape is arranged to give each instruction code followed by the complements of the first sixteen digits of each of the numbers in the corresponding instruction number series, and to provide signals for controlling the test procedure. The second punched tape is arranged to give each instruction code followed by the complements of the last fifteen digits of each of the numbers in the corresponding instruction number series, and to provide signals for controlling the test procedure. The arrangement of a typical portion of one of the punched tapes is described in greater detail hereinafter.

The connection between the switch MXS and the drive mechanism of the tape reader TR is such that the tape reader TR is advanced one step at each step of the switch MXS. The switch MXS is a seven-bank twelve position rotary switch and is operated manually; its main function is to work as a distributor in synchronism with the tape reader TR so that outputs from five tracks on the punched tape may be used to control thirty-three signal lines as required. At each step of its rotation it also applies a pulse to the restart line 17. The operation of the switch MXS will be described in greater detail hereinafter.

To test the control section 1, it is arranged to operate under "cycle stop" conditions. That is to say, it is arranged to perform one action at a time, each action requiring simultaneous pulses on the control stop line 16 and the restarting line 17 to allow it to proceed. The first tape is fitted to the tape reader TR, its position is synchronised with the position of the multiplexing switch MXS, and the switch CWS is put in its first position. The switch MXS is then turned, and as the tape is advanced in synchronism with the switch, signals from the tape are directed through the switch MXS and lines of the set 7b to operate gates within the registers section 2 and thereby enter the first instruction code into an appropriate part of the registers section 2, and to cause the first instruction code to be applied on the link 4a to the control section 1. This causes the control section 1 to set out on the sequence of actions corresponding to the first instruction code. The control section 1 should then perform the first action of the first instruction sequence, applying to the switch CWS output voltages on those ones of its output lines which ought to be energised during this action. These should be the lines associated with the digit positions of the ones in the first number of the first instruction number series. Meanwhile further synchronized steps of the switch MXS and the tape in the tape reader TR are sending signals to the registers section 2 to set up the complement of the appropriate part of the first number in the first instruction number series in one of the registers of the registers section 2. Further signals from the tape in the tape reader TR now cause the outputs from the switch CWS to be added to the complementary number set up in the registers section 2, and render operative the fault detector FD. If no fault has occurred, no significant zeroes will occur in the result of this summation. The next steps of the switch MXS and of the tape in the tape reader TR will then cause the registers of the registers section to be reset and a pair of pulses to be applied via the lines 16 and 17 to the control section 1, thereby allowing the control section 1 to perform the second action of the first instruction sequence. If, however, a significant zero does occur, the fault detector FD disconnects the power supplies to the tape reader TR and the switch MXS, so that the tape is immobilised and the registers section 2 and the control section 1 remain in the condition which they have reached when the zero was detected, although the operator may have continued to turn the switch MXS. The position of the tape and the state of the registers after any such stoppage shows which action of the computer has been faulty, and thereby gives an indication as to the source of the fault.

If no fault occurs, continued operation of the switch MXS drives the tape through the tape reader TR so that the signals from the tape cause every action of the instruction sequence to be checked in a similar way. Further stepping of the switch MXS and the tape in the tape reader TR then applies the second instruction code through the registers section 2 and the line 4a to the control section 1, and causes every new action in the second instruction sequence to be checked in its turn. Some of the actions of the control section 1 are common to several, or in some cases all, of the instruction sequences. Where an action is used which has previously been checked in connection with another instruction sequence, it is not rechecked. In these places the sequence is arranged to apply an appropriate number of consecutive pulses to the "control stop" line 16, so that the control section 1 proceeds quickly through the sequence to the next action which requires checking. In this way the testing process is continued until every required action of the control section 1 has been checked in so far as it concerns the first batch of outputs of the control section 1. The switch CWS is then put into its second position and the second tape driven through the tape reader TR in synchronism with the switch MXS, so as to check every action of the control section 1 with reference to the second batch of outputs thereof. It may be arranged that the progress of the tests is indicated by a count of actions and instructions checked, which is entered in one of the registers of the registers section 2 and may be displayed by the monitor 12. This count will then afford an indication of the location of the fault.

Figure 4:
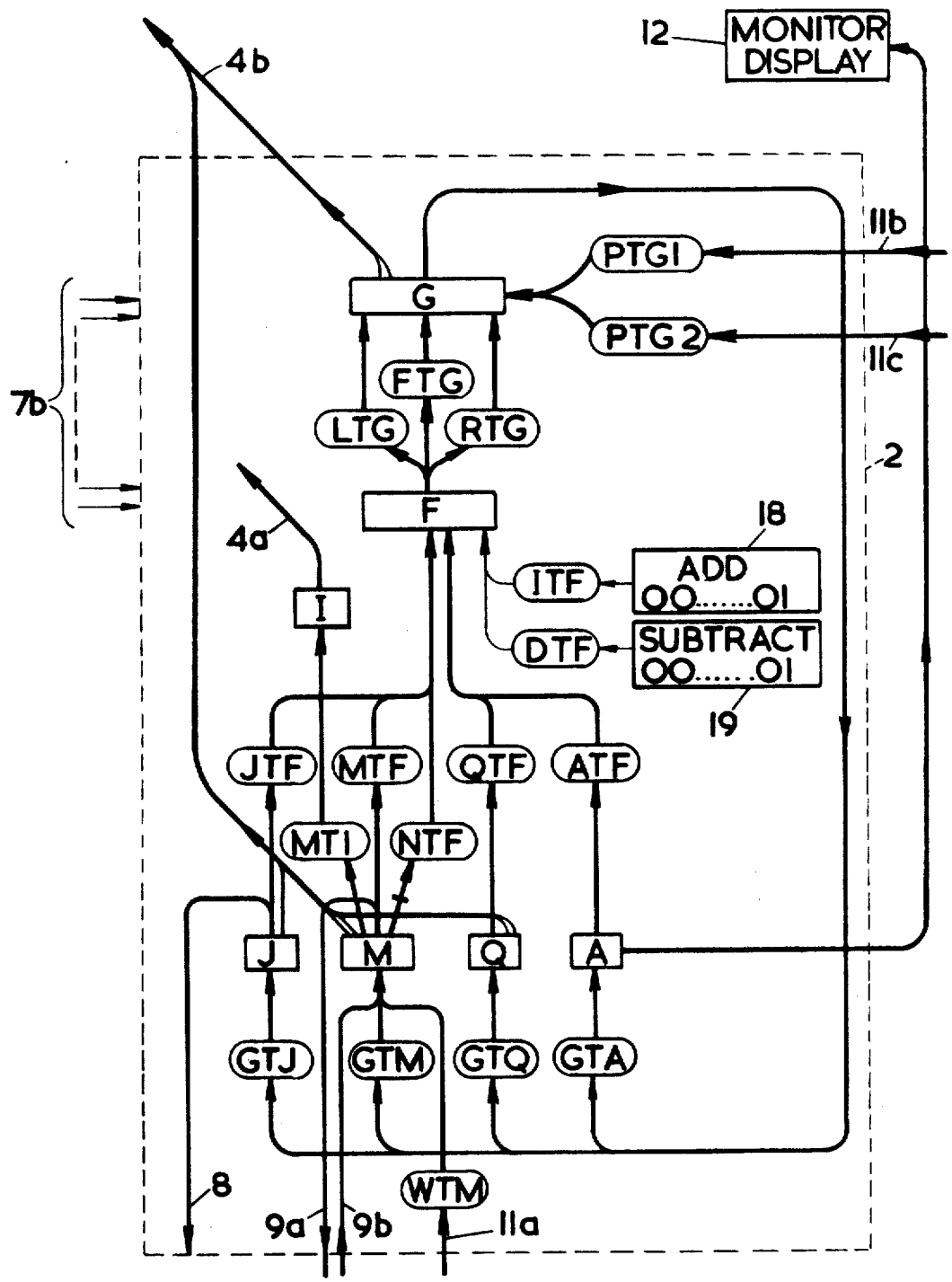
FIG. 4 is a schematic block diagram showing the main parts of the registers section of the computer of FIG. 1 in greater detail.

The test procedure will now be described in greater detail, with reference to FIGS. 4, 5, 6 and 7. FIG. 4 shows the arrangement of registers, gates and interconnecting lines in the registers section 2 of a known computer. On FIG. 4, gates are represented by oval blocks and registers are represented by rectangular blocks.

FIG. 4 shows a register G having an output connected to four registers A, Q, M and J by four gates GTA, GTQ, GTM and GTJ respectively. The input of the register M is also connected through a gate WTM to the input link 11a, and is directly connected to a line 9b which comes from the memory section 3 (not shown in FIG. 4). Outputs from the registers A and Q are connected through gates ATF and QTF respectively to a first input of an adding register F. Outputs from the registers M and J are connected through gates MTF and JTF respectively to a second input of the adding register F. The outputs of the registers J and M are also connected to the memory section 3 (not shown in FIG. 4) by links 8 and 9a respectively. An inverse output from the register M is connected through a gate NTF to the second input of the register F. Two data input links 11b and 11c are connected through gates PTG1 and PTG2 respectively to an input of the register G.

The registers G, A, Q and M are each capable of storing an 18-digit number in parallel form and the gates GTA, GTQ, GTM, ATF, QTF, MTF, NTF, WTM and PTG1 are each capable of transmitting such numbers. The adding register F can add two 18-digit numbers respectively applied to its first and second inputs, but it does not store the result and resets itself when the input signals to it are removed. The register J is capable of storing a 13-digit number in parallel form and the gate GTJ is arranged so that, when energised, it will cause the thirteen least significant digits in the register G to be entered in the register J. For convenience the various digit positions in the registers G, A, Q, M, F and J will be numbered from the least significant to the most significant, and may be referred to hereinafter by the letter reference of the register followed by the number of the digit position. For instance G1 will be used to indicate the least significant digit position in the register G, and M18 will be used to indicate the most significant digit position in the register M.

The digit positions M14 to M17 inclusive of the register M are used for conveying instruction codes, and have outputs connected through a gate MTI to a register I. The register I has four digit positions with outputs connected by a link 4a to the control section 1 (FIG. 1). The digit positions M13, M18, G13, G18, Q1, Q2 and J12 are used to convey instruction-modifying signals and have outputs connected through a link 4b to the control section 1 (FIG. 1). The link 4b also includes a channel (not shown) for carrying an inverted output $\overline{M18}$ from the digit position M18. An input to the least significant digit position F1 of the adding register F is connected through gates 1TF and DTF respectively to an "add one" device 18 and a "subtract one" device 19. These are arranged so that when the gate 1TF is operated, 000 . . . 001 is added to the other inputs of the adding register F, and when the gate DTF is operated, 000 . . . 001 is subtracted from the other inputs of the adding register F.

The adding register F has outputs linked to the register G by three alternative paths which include gates LTG, FTG, and RTG respectively. Operation of the gate FTG causes any 18-digit number developed in the adding register F to be entered in the register G. Operation of the gate LTG causes a similar transfer but shifts the number concerned one digit to the left; that is, it causes the seventeen least significant digits of the number in the adding register F to be entered in the seventeen most significant digit positions of the register G. Operation of the gate RTG causes a similar transfer but shifts the number one digit to the right; that is, it causes the seventeen most significant digits of the number in the adding register F to be entered in the seventeen least significant digit positions of the register G. The register A is connected to, and its contents are indicated by, the monitor display 12. The control inputs lines 7b include eighteen lines each connected to control a separate one of the gates GTA, GTQ, GTM, GTJ, WTM, ATF, QTF, MTF, JTF, NTF, 1TF, DTF, MTI, LTG, FTG, and RTG, and six lines each connected to a resetting input of a separate one of the registers A, Q, M, J, I and G. The connections of these lines 7b are not shown in FIG. 4, to simplify the drawing.

Figure 5:
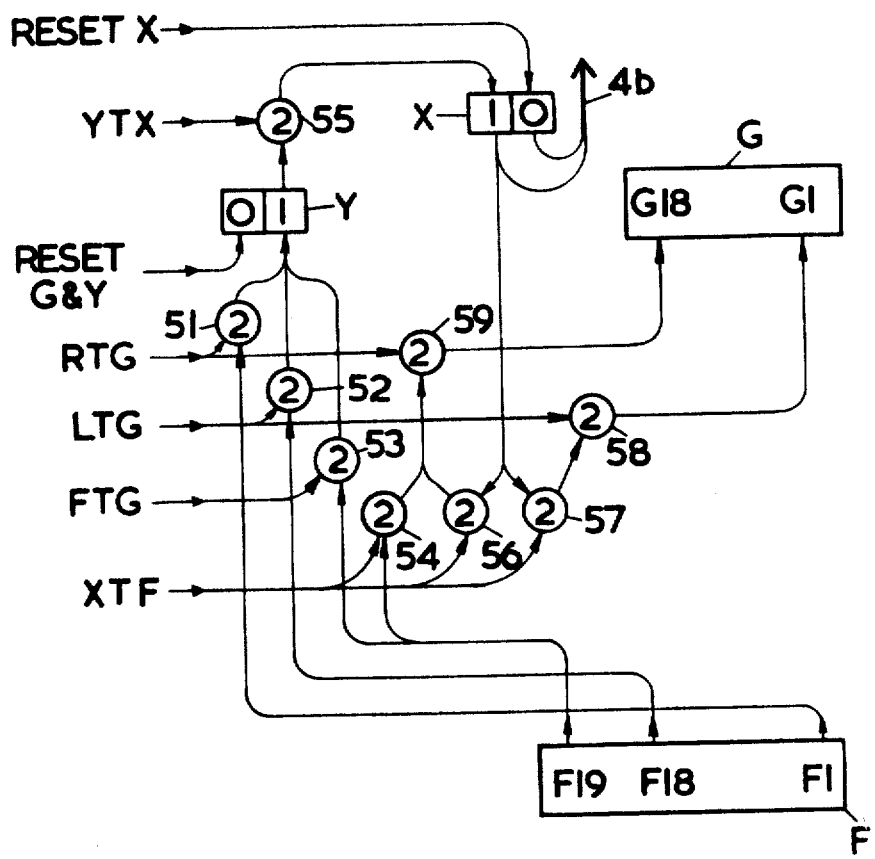
FIG. 5 is a schematic circuit diagram of further parts of the registers section of FIG. 1.

FIG. 5 shows part of the registers section for detecting overflows, that is to say occasions on which a digit might be lost in an addition or transfer, and for providing a facility for the reinsertion of such digits where appropriate at a later stage in a calculation. Digit positions F1, F18 and F19 of the register F have outputs connected to inputs of and-gates 51, 52 and 53 respectively. The output of the digit position F19 is also connected to an input of an and-gate 54. Outputs of the gates 51, 52 and 53 are connected to a 1-state setting input of a bistable element Y. An output from the 1-state of the bistable element Y is connected through an and-gate 55 to a 1-state setting input of another bistable element X. An output from the 1-state of the bistable element X is connected to inputs of two and-gates 56 and 57. An output from the and-gate 57 is connected through an and-gate 58 to the digit position G1 of the register G. Outputs from the gates 54 and 56 are connected through an and-gate 59 to the digit position G18 of the register G.

Some of the control input lines 7b are connected to the elements and gates of FIG. 5 as follows: A line XTF is connected to inputs of the gates 54, 56 and 57. The line FTG is connected to an input of the gate 53. The line LTG is connected to inputs of the gates 52 and 58, and the line RTG is connected to inputs of the gates 51 and 59. The resetting line for the register G is connected to a 0-state resetting input of the bistable element Y. A line YTX is connected to the input of the and-gate 55, and a resetting line is provided for resetting the bistable element X to its 0-state. Complementary outputs X and $\overline{X}$ from the 1-state and the 0-state respectively of the bistable element X are connected through lines of the link 4b to the control section 1 of FIG. 1. FIGS. 4 and 5 are provided for reference in connection with the following more detailed descriptions of the testing procedure.

Figure 6:
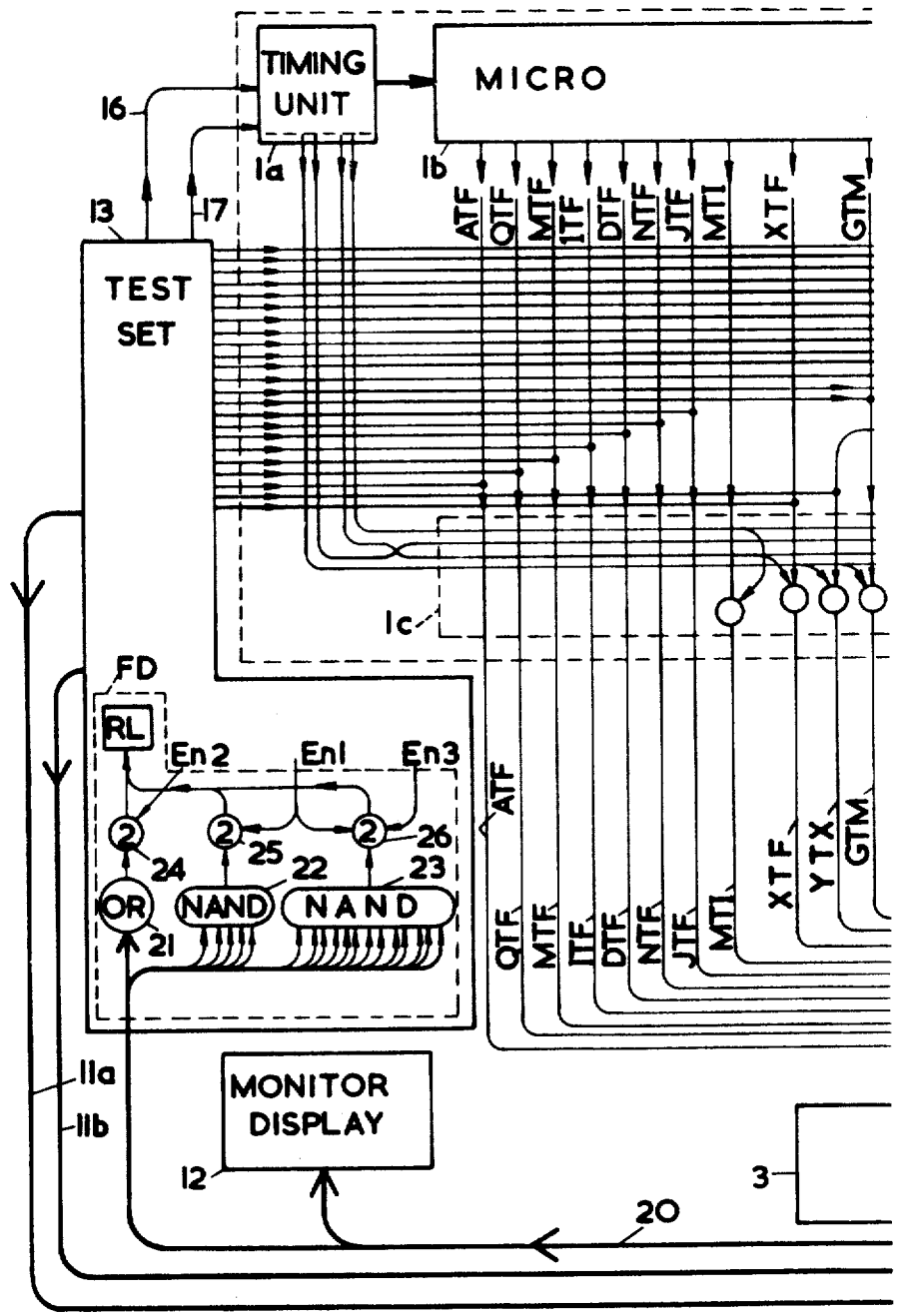
FIGS. 6 and 6A are schematic block diagrams showing the computer of FIG. 1 having some of its normal interconnections disconnected and connected to a test set for the purpose of testing its registers section and its memory section.
Figure 6A:
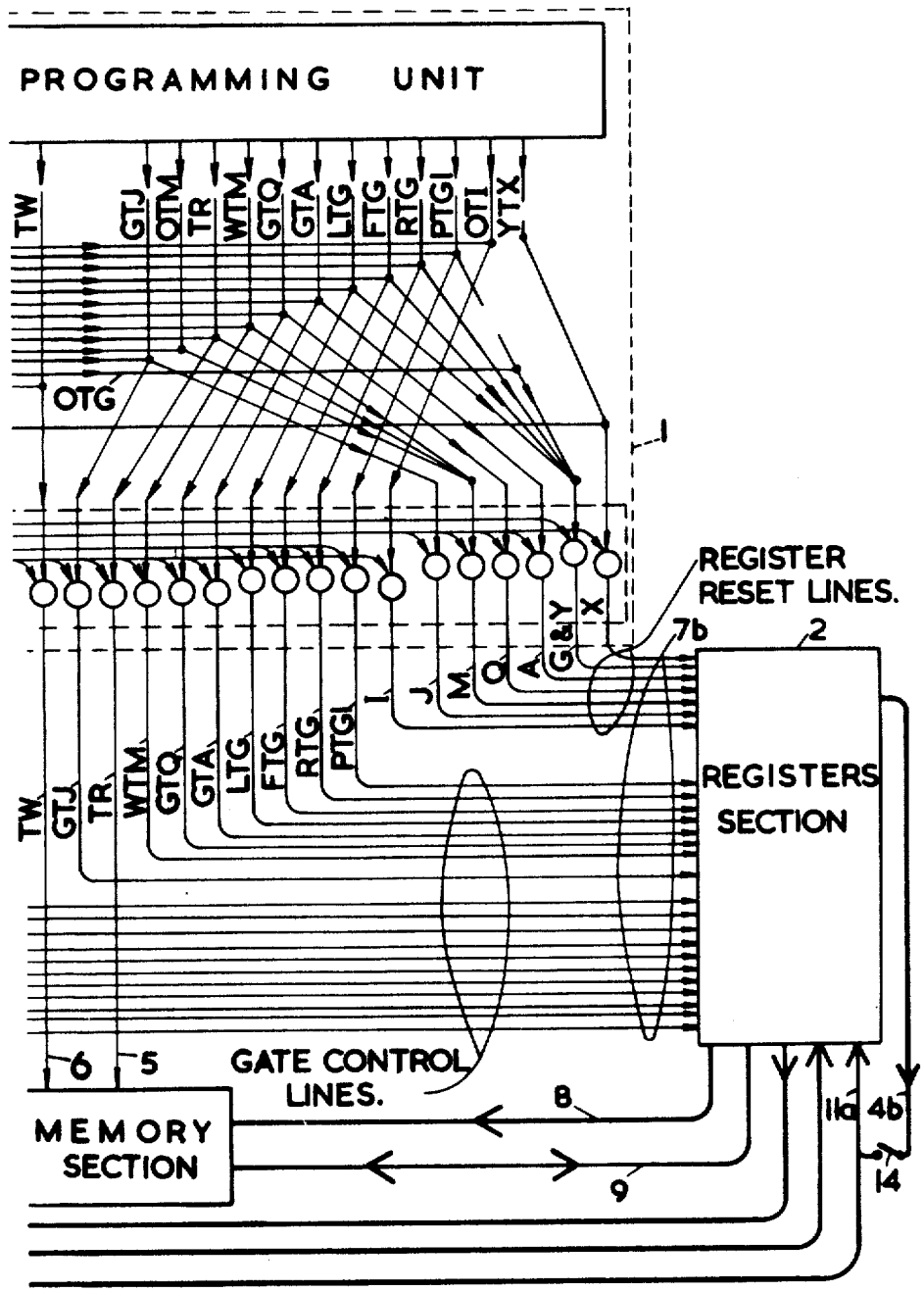
Figure 7:
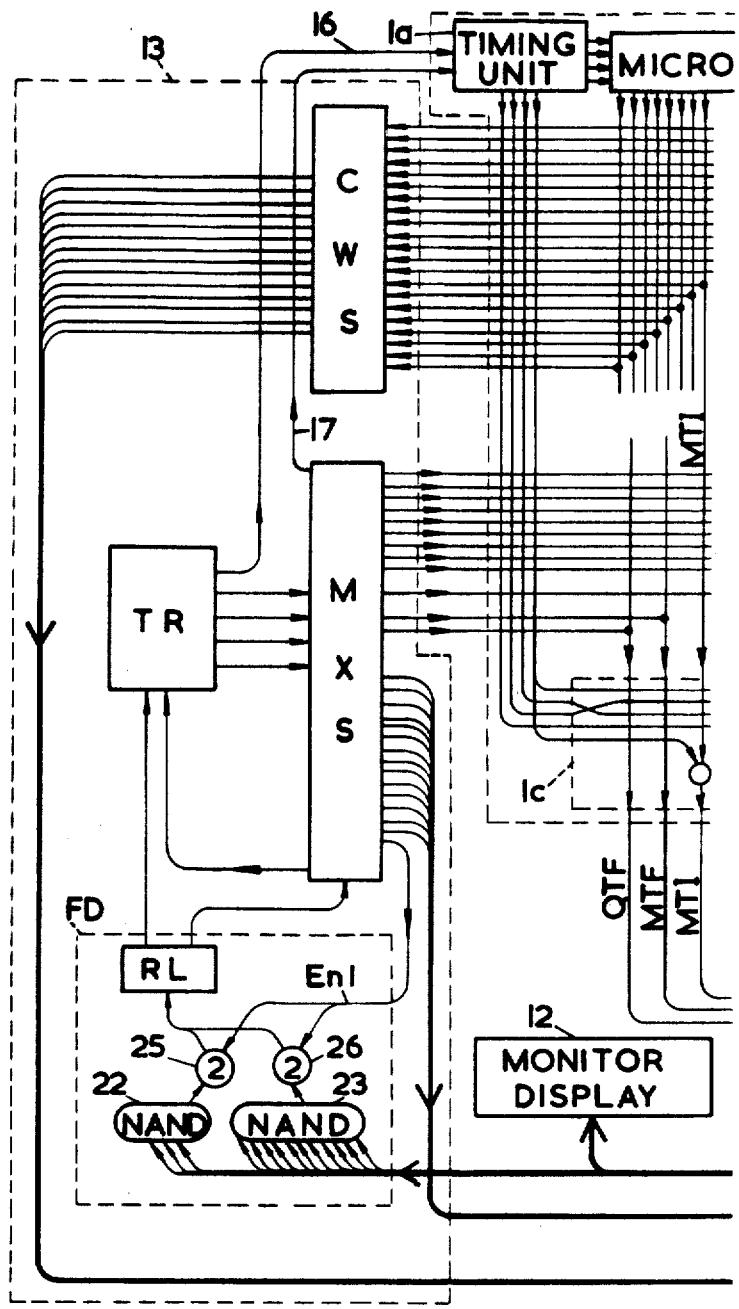
FIGS. 7 and 7A are schematic block diagrams showing the computer of FIG. 1 having some of its normal interconnections disconnected and connected to a test set for the purpose of testing its microprogramming unit.
Figure 7A:
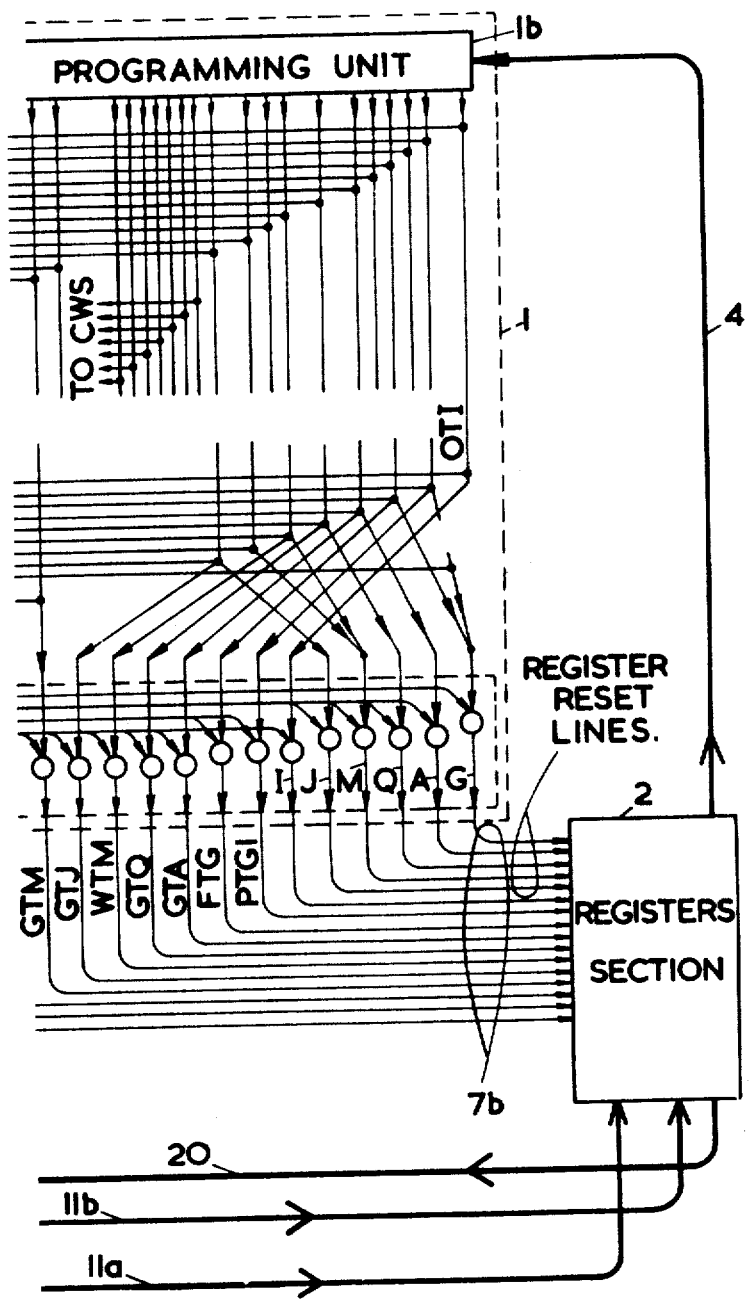
Figure 8:
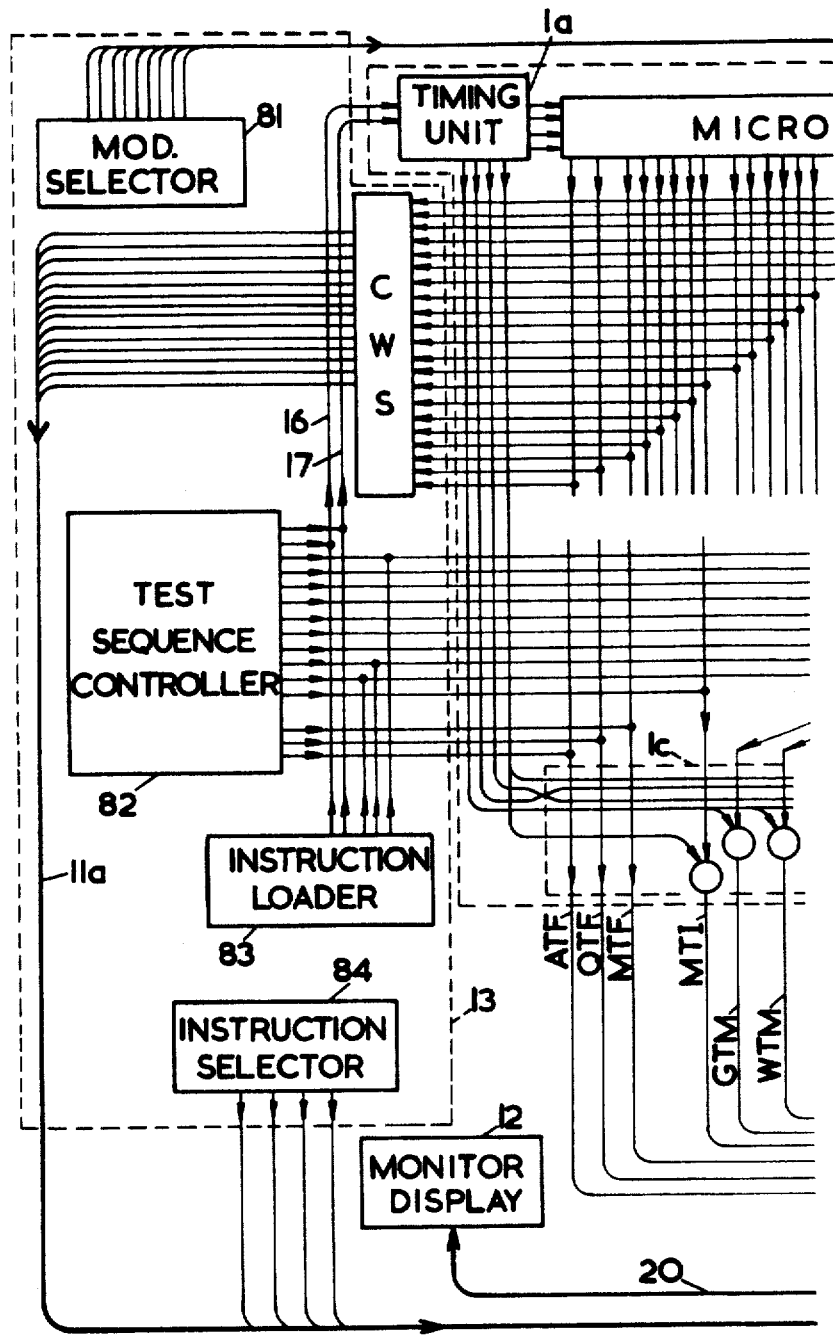
FIGS. 8 and 8A are schematic diagrams of a test set and the computer of FIG. 1 in an alternative arrangement for testing the microprogramming unit of the computer.
Figure 8A:
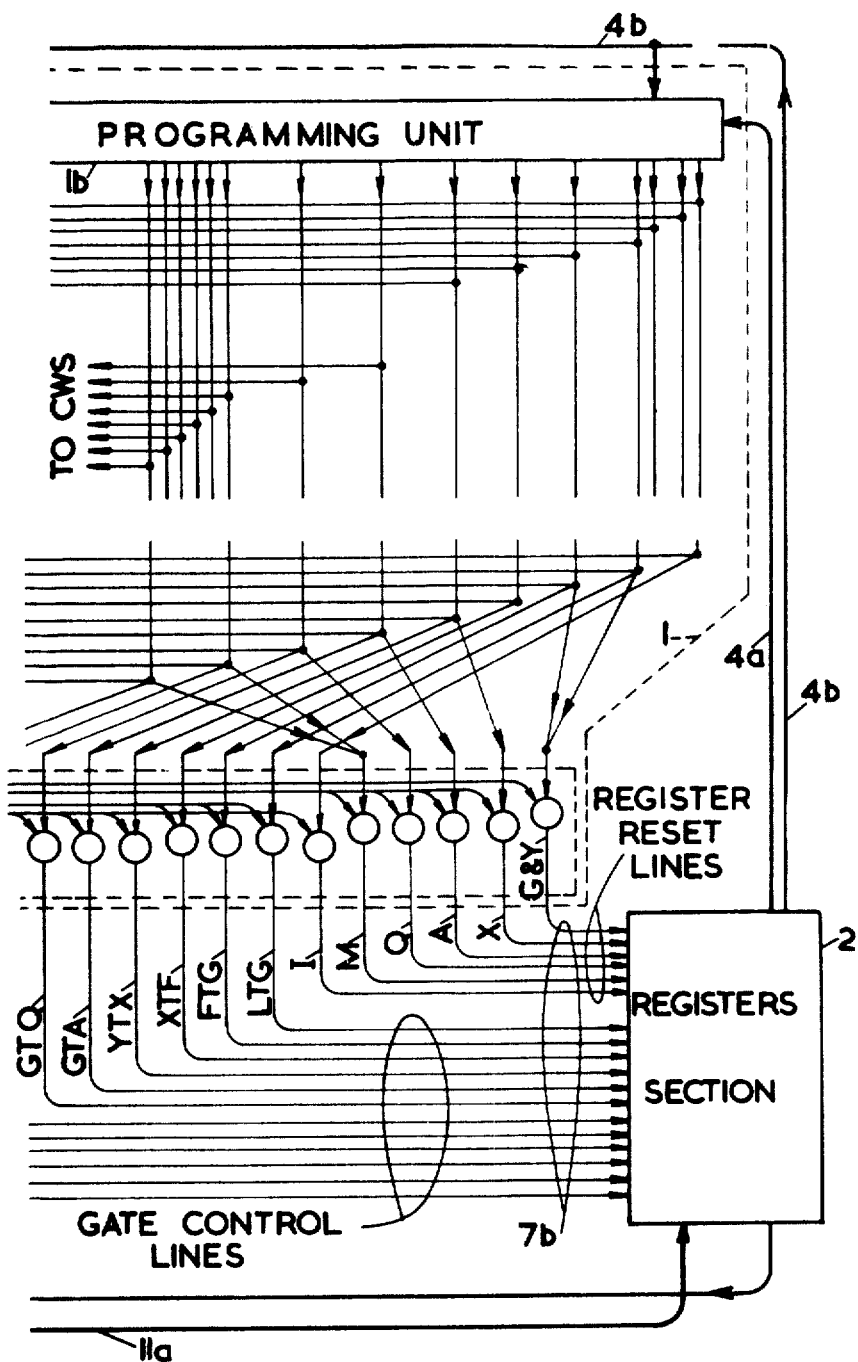

To make the tests more realistic, the testing signal outputs from the test set should preferably be gated by a timing unit so that they are only applied to the parts under test for a time comparable to the duration of a control signal in the normal operation of the computer. This is most conveniently accomplished by making the disconnections between the outputs of the microprogramming unit 1b and the inputs of the gates 1c, applying the outputs of the test set 13 to the inputs of the gates 1c, and allowing the timing unit 1a to control the opening of the gates 1c (see FIG. 1). Arrangements of this sort are shown in FIGS. 6 and 7 wherein the lines of the set 7b are also marked with the reference of the gate or register whose opening or resetting operations they respectively control. In FIGS. 6, 7 and 8 the breaks in the lines shown represent temporary disconnections made to simplify the tests.

FIG. 6 shows the interconnections made for tests of the registers section 2 and the memory section 3; additional interconnections and details irrelevant to these tests have been omitted. The timing unit 1a is shown with its normal output connections to the microprogramming unit 1b and to the gates 1c. All except two of the outputs of the microprogramming unit 1b are disconnected; the exceptions are the output controlling the gate MTI and the output OTI which controls the resetting of the register I. The gates 1c are shown in detail. The control lines passing through the gates 1c are marked with references which indicate the gates or actions which they control. The seven control lines controlling transfers into the register F, which are shown towards the left-hand side of FIG. 6, are not in fact gated but have direct connections passing through the unit containing the set of gates 1c to the appropriate lines of the link 7b. The six gates at the right-hand side of the set 1C in FIG. 5 control resetting operations of the registers through register reset lines. The controlling inputs of these six gates are connected by normal connections of the computer to lines which are also connected to control, through other gates of the set 1c, various gates concerned with entering signals into the registers. Thus the line for controlling the gate GTJ is also connected to the gate controlling the resetting of the register J; lines OTM, TR and WTM are also connected to the gate controlling the resetting of the register M; the lines GTQ and GTA are also respectively connected to the gates controlling the resetting of the registers Q and A; and the lines LTG, FTG, RTG and PTG1 are also normally connected to the gate controlling the resetting of the register G. However, for the testing procedures hereinafter described with reference to FIGS. 6 and 7 the connection from the line PTG1 to this gate is disconnected. Outputs from the test set 13 are connected to all the disconnected control lines, on the side of the disconnections leading to the inputs of the gates 1c. An output OTG from the test set 13 is connected to the gate controlling the resetting of the register G.

The control lines TR and TW are connected through gates of the set 1c and lines 5 and 6 respectively to the memory section 3. The remaining outputs of the gates 1c, comprising gate control lines and register reset lines, are connected to the inputs 7b of the registers section 2. The registers section 2 is connected to the memory section 3 by links 8 and 9 as in FIG. 2. The registers section 2 has an output (from the register A, FIG. 4) which is connected by a link 20 to a monitor display 12 and to a fault detector FD within the test set 13.

The fault detector FD includes an OR-gate 21 having eighteen inputs connected by the link 20 to receive signals from the eighteen digit positions in the register A, a NAND-gate 22 having five inputs connected by the link 20 to receive signals from the five most significant digit positions in the register A, and a NAND gate 23 having thirteen inputs connected by the link 20 to receive signals from the thirteen least significant digit positions in the register A. Outputs from the gates 21, 22 and 23 are connected to gates 24, 25 and 26 respectively. These gates 24, 25 and 26 are AND-gates of threshold two. The test set 13 has three lines $En1$, $En2$ and $En3$ connected to control gates 24, 25 and 26. The line $En2$ controls the gate 24. The line $En1$ is connected to inputs of the AND-gates 25 and 26. The line $En3$ is connected to an input of the gate 26. The outputs of the gates 24, 25 and 26 are connected to operate a relay RL. The links 11a and 11b connect outputs of the test set 13 to inputs of the registers section 2.

Further outputs from the test set 13 are connected to the "control stop" line 16 and to the restarting line 17. The "control stop" line 16 controls the outputs from the timing unit 1a to the microprogramming unit 16, whereas the restarting line 17 controls the outputs from the timing unit 1a to the gates 1c.

The registers sections is tested on four stages. During the first stage, signals representing "all ones" are applied to the links 11a and 11b, the switch 14 is open-circuited and the test set 13 is operated to provide control signals in the sequence shown in the second column of Table I. During the second stage, signals representing "all zeroes" are applied to the links 11a and 11b, the switch 14 is left open-circuited and the test set 13 is operated to provide control signals in the sequence shown in the second column of Table II. The parts checked by each test listed in the third columns of Tables I and II. The gates 1TF and DTF are adequately checked in the first stage tests, but for a complete check on any other part, it must be found to operate correctly in both the first stage and the second stage tests.

The test set 13 is arranged to produce a signal $En1$ at times when the occurrence of a zero in any digit position of the register A would indicate a fault, to produce a signal $En2$ at times when the occurrence of a one in any digit position of the register A would indicate a fault, and to produce a signal $En3$ at times when the occurrence of a zero in any one of the thirteen least significant digit positions of the register A would indicate a fault. A fault occurring during any test should result in the relay RL being operated; this relay RL is arranged to disconnect power supply connections to the test set 13 and the timing

TABLE I.—REGISTERS SECTION TEST, STAGE 1

["All ones" applied to lines 11a and 11b]

| Test: | Test set signals | Parts tested |
|---|---|---|
| (i) | OTG, OTM, PTG1, GTA, GTQ, En1 | Gates PTG1 and GTA registers G and A. |
| (ii) | ATF, FTG, GTJ, GTA, En1 | Gates ATF and FTG. |
| (iii) | QTF, FTG, GTM, GTA, En1 | Gates GTQ and QTF register Q. |
| (iv) | MTF, 1TF, FTG, YTX, GTA, En2 | Gates GTM, MTF and 1TF register M. |
| (v) | NTF, DTF, FTG, GTA, En1 | Gates BTF and DTF. |
| (vi) | JTF, FTG, WTM, GTA, En3 | Gates GTF and JTF register J. |
| (vii) | MTF, FTG, GTA, En1 | Gate WTM. |
| (viii) | MTF, XTF, RTG, GTA, YTX, En1 | Gates 53, RTG, YTX(55), 56 and 59. |
| (ix) | MTF, XTF, LTG, GTA, YTX, En1 | Gates 51, LTG, 57 and 58. |
| (x) | MTF, RTG, GTA | |
| (xi) | MTF, 1TF, XTF, RTG, OTM, GTM | |
| (xii) | MTF, ATF, FTG, GTA, En1 | Gates 52 and 54. |

TABLE II.—REGISTERS SECTION TEST, STAGE 2

["All zeroes" applied to lines 11a and 11b]

| Test: | Test set signals | Parts tested |
|---|---|---|
| (i) | ITG, OTM, PTG1, GTA, GTQ, En2 | Gates PTG1 and GTA registers G and A. |
| (ii) | ATF, FTG, GTJ, GTA, En2 | Gates ATF and FTG. |
| (iii) | QTF, FTG, TM, GTA, En2 | Gates GTQ and QTF register Q. |
| (iv) | MTF, FTG, YTX, GTA, En2 | Gates GTM and MTF register M. |
| (v) | NTF, FTG, En1 | Gate NTF. |
| (vi) | JTF, FTG, WTM, GTA, En1 | Gates GTJ and JTF register J. |
| (vii) | MTF, FTG, GTA, En2 | Gate WTM. |
| (viii) | MTF, XTF, RTG, GTA, YTX, En2 | Gates 53, RTG, YTX(55), 56 and 59, bistable elements X and Y. |
| (ix) | MTF, XTF, LTG, GTA, YTX, En2 | Gates 51, LTG, 57 and 58. |
| (x) | MTF, RTG, GTA | |
| (xi) | MTF, XTF, RTG, OTM, GTM | |
| (xii) | MTF, ATF, FTG, GTA, En2 | Gates 52 and 54. | unit 1a and thereby stop the testing sequence. The test on which the fault occurred may then be ascertained by inspection of the test set 13. The faulty part will be one of the parts listed in the third column of Table I or Table II in the row appropriate to that test, and the digit position affected by the fault will be shown by the monitor display 12. Thus the source of the fault is localised, and shown to be due to one of a comparatively small group of circuits or devices.

From Tables I and II, it will be seen that already tested actions of parts of the registers section are used in checking the actions of different parts of the registers section. For instance actions of the registers G and A and the gate GTA, which are checked in test (ii), are used in checking the gates NTF and DTF in test (v).

The third and fourth stages are to test the transmission of instruction-modifying signals from the registers section. For this the multipole switch 14 is closed. The test set 13 is then operated to generate a sequence of signals to fill all the registers with "all ones" and then open the gate WTM and then the gates MTF, FTG and GTA. This transfers the instruction-modifying signals generated by all ones in the registers through the link 4b, the multipole switch 14, and channels of the link 11a, to the digit positions 1 to 12 inclusive of the registers M, F, G and A and the monitor display unit 12. A slight complication arises with the computer herein considered, because three of the instruction-modifying signals are themselves derived from the contents of the register M, and the signal WTM is arranged to reset the register M to all zeroes before it opens the gate WTM. To allow these three instruction-modifying signals to be checked, bistable elements (not shown) are provided in the connections which carry them from the switch 14 to the data input link 11a. These bistable elements are arranged to be set up by the instruction-modifying signals and reset by a signal from the timing unit 1a after the signals have been transmitted through the gate WTM. In the fourth stage the test set 13 is operated to fill all the registers with "all zeroes" and then open the gates WTM followed by the gates MTF, FTG and GTA. This allows the checking of instruction-modifying signals derived from zeroes in the registers, and would reveal the occurrence of spurious instruction-modifying signals.

The test set signals may be produced by stepwise rotation of a multi-contact rotary switch or switches (not shown) whose contacts are appropriately connected to power supplies and to the signal lines of the test set. No attempt is made to check actions of the gate MTI and the register I in these tests, as in the present application there is no convenient means for verifying the contents of the register I. This is the reason why the line controlling the gate MTI and the register resetting line OTI need not be disconnected from the microprogramming unit 1b or connected to the test set 13. The correct operation of the gate MTI and the register I can, in this particular application, be more conveniently inferred from the test of the microprogramming unit 1b which are described hereinafter with reference to FIG. 7 or FIG. 8.

It will be noted that the gates of the set 1c are arranged in groups which receive different signals from the timing unit 1a. Thus any failure of the timing unit 1a will affect a group of control signals, and may be recognised by the combination of control signals affected. Where any control line is connected to a register reset line as well as to a gate control line, the associated gates of the set 1c are connected to different outputs of the timing unit 1a so that the register reset line is energised, and the resetting operation completed, before the associated gate control line is energised to enter a data signal into the newly-reset register.

To test the memory section 3, the address of the first storage location to be checked (usually "all zeroes") is entered into the register J. The test set 13 is then operated to provide a sequence of signals as shown in the second and third columns of Table III. This sequence is repeated until the storage locations to be tested have been filled with a first pattern of alternate ones and zeroes. This pattern is then checked, by resetting the register J to the address of the first storage location to be checked and operating the test set 13 to provide a sequence of signals as shown in the fourth column of Table III. This sequence is repeated until the first pattern has been completely checked. The occurrence of a fault at any stage will cause the relay RL to operate and interrupt the tests. The digit position affected will then be shown by the monitor display 12, and the address of the storage location affected can be obtained from the register J.

The test described in the preceding paragraph is then repeated with the test signal Ch 1 replacing the test signal Ch 0 and vice-versa wherever either test signal occurs in Table III, so as to perform a complementary test involving a second pattern of alternate ones and zeroes which is complementary to the first pattern. The test set signals for these tests may be produced by stepwise rotation of a multi-contact rotary switch (not shown) within the test set 13. The sequence of Table III depends on the fact that the loading sequence always loads an even number of storage locations, and leaves the register Q filled with a test signal (Ch 0 in the case of the first pattern) which is complementary to the test signal entered in the first storage location to be tested.

TABLE III.—MEMORY SECTION TEST, FIRST PATTERN

| | Loading Sequence | | Checking Sequence |
|---|---|---|---|
| Switch Position | Test signal outputs to line 11a | Test set control line outputs | Test set control line outputs |
| 1 | Ch 1 | TR | TR |
| 2 | | WTM | MTF, QTF, FTG<br>GTA<br>En1 |
| 3 | | MTF, FTG<br>GTQ | |
| 4 | | JTF, lTF, FTG, TW | JTF, lTF, FTG, TW |
| 5 | | GTJ, GTA | GTJ, GTA |
| 6 | | | |
| 7 | | TR | TR |
| 8 | Ch 0 | WTM | NTF, QTF, FTG<br>GTA<br>En1 |
| 9 | | MTF, FTG<br>GTQ | |
| 10 | | JTF, lTF, FTG, TW | JTF, lTF, FTG, TW |
| 11 | | GTJ, GTA | GTJ, GTA |
| 12 | | | |

A signal on the control line TW (an abbreviation for "trigger write") applies a pulse to the line 5 which causes the number then in the register M to be stored in the storage location whose address is currently held in the register J. A signal on the control line TR (an abbreviation for "trigger read") applies a pulse to the line 6 which causes the number stored in the storage location whose address is currently in the register J to be entered via the link 9b into the register M.

control output lines of the microprogramming unit 1b are connected to inputs of a switch CWS. The control output lines MTI and OTI which control the gate MTI and the resetting of the register I respectively have their normal connections to gates of the set 1c, but the remaining outputs of the microprogramming unit 1b are disconnected from the inputs to the gates 1c as in FIG. 6. The outputs of the gates 1c have their normal connections to the control input lines 7b of the registers section 2. The registers section 2 has an output from the register A (FIG. 4) which is connected by the link 20 to the monitor display 12 and the NAND-gates 22 and 23 of the fault detector FD. Moreover, the inputs of the NAND-gates 22 and 23 which during the tests of the registers section and the memory section were connected to the eighteenth, and seventeenth digit positions of the register A are now connected, preferably through the switch CWS, to a source of the one-level voltage (not shown). The NAND-gates 22 and 23 are connected through gates 25 and 26 to the relay RL as in FIG. 6, and the line En1 which controls the gates 25 and 26 is connected to an output of the switch MXS. Further outputs of the switch MXS are connected to the data signal input link 11b of the register section 2. The relay RL controls power supplies to a tape reader TR and the switch MXS. The drive mechanism of the tape reader TR and the restarting line 17 of the timing unit 1a are connected to further ouputs of the switch MXS. The tape reader TR has one output connected to the "control stop" line 16 of the timing unit 1a, and four outputs connected to inputs of the switch MXS. The outputs of the switch CWS are connected to the data signal input 11a of the registers section 2. The register I of the registers section 2 has its normal connection via the link 4a to the microprogramming unit 1b.

The switch MXS is arranged to drive the tape reader TR and to apply pulses to the restarting line 17 as hereinbefore described with reference to FIG. 3. The tape reader TR and the switch MXS are connected so that holes in the tape will produce signals which are directed to produce actions as shown in Table IV. In Table IV the notation G18 is used to denote the 18th (most significant) digit position on the link 11b, leading to the 18th digit position in the register G if the gate PTG1 is open; similarly G17 denotes the next digit position, and G1 the least significant digit position on the link 11b. The contacts of the switch MXS which are connected to the restarting line 17 are physically retarded to make contact later than the other contacts of the switch MXS.

TABLE IV

| Position of switch MXS | Effects of holes in tape | | | | |
|---|---|---|---|---|---|
| | Track 1 | Track 2 | Track 3 | Track 4 | Track 5 |
| 1 | | | | Open PTG1 | |
| 2 | | Put 1 on G16 | Put 1 gn G15 | do | Energize OTI. |
| 3 | | Put 1 on G14 | Put 1 on G13 | do | |
| 4 | | Put 1 on G12 | Put 1 on G11 | do | |
| 5 | | Put 1 on G10 | Put 1 on G9 | do | |
| 6 | (¹) | Put 1 on G8 | Put 1 on G7 | do | Energize GTJ. |
| 7 | | Put 1 on G6 | Put 1 on G5 | do | Open GTM. |
| 8 | | Put 1 on G4 | Put 1 on G3 | do | Energize WTM. |
| 9 | | Put 1 on G2 | Put 1 on G1 | do | Energize GTQ. |
| 10 | | Open MTF | Open QTF | Energize FTG | Energise GTA. |
| 11 | | Energise OTG | Energise OTM | Energise Z2 | |
| 12 | | | Energise OTC | Energise En1 | |

¹ Pulse "control stop" line 16 of timing unit 1a (in any position of switch MXS).

FIG. 7 shows an arrangement of interconnections for testing the microprogramming unit 1b. To simplify the drawing, parts and interconnections which are not used in, and do not affect the testing of the microprogramming unit 1b have been omitted in FIG. 7. The timing unit 1a has its normal connections to the microprogramming unit 1b and the gates 1c. Outputs from the test set 13, which in this case come from a switch MXS, are connected to some of the control lines as in FIG. 5. The The control output lines of the microprogramming unit 1b may be connected through the switch CWS, the link 11a and the gate WTM to various digit positions in the register M; Table V shows which control output lines may be associated with each digit position in the register M in the present embodiment. In Table V the control output lines of the microprogramming unit 1b are identified by the gates or registers which they ordinarily control, in the normal use of the computer.

TABLE V

| Control output lines | | Corresponding digit position in register M |
|---|---|---|
| 1st batch | 2nd batch | |
|  |  | M18 [1] |
|  |  | M17 |
| SZ1 |  | M16 |
| PTG | WTM | M15 |
| IST | OTZ | M14 |
| MTI | OTM | M13 |
| ITF | OTI | M12 |
| NTF | K5 | M11 |
| DTE | K1 | M10 |
| RTG | GTM | M9 |
| XTF | ETK | M8 |
| JTF | KTJ | M7 |
| DTF | GTA | M6 |
| ATF | TW | M5 |
| QTF | TR | M4 |
| MTF | GTQ | M3 |
| LTG | GTJ | M2 |
| FTG | YTX | M1 [2] |

[1] Most significant digit position.
[2] Least significant digit position.

Several of the control output lines listed in Table V are not mentioned elsewhere in the specification because they are provided to control facilities of the computer which are not necessary to an understanding of the present invention. Table VI is given as an example, showing how an instruction code is transferred from the tape and via the switch MXS, the gates 1c and the register section 2 to the microprogramming unit 1b and how the first action of the corresponding instruction sequence is checked in the course of tests on a specific computer which is generally of the form shown in FIGS. 1, 4 and 5. This example concerns an instruction code "five" and the first action of the corresponding sequence in so far as it concerns the first batch of outputs of the microprogramming unit 1b. This instruction code "five" would in the normal action of the computer initiate a sequence of actions resulting in the storage of the number currently in the register A in a storage location whose address is presented with the code "five." The first action of the sequence for instruction code "five" should produce signals for opening the gates ATF, FTG and IST by outputs among the first batch, and should produce an output for opening the gate GTJ and an output TR on the line 6 among the second batch of outputs of the microprogramming unit 1b.

TABLE VI

| Position of switch MXS | Tape Holes Tracks | | | | | Resulting Actions |
|---|---|---|---|---|---|---|
| | 1 | 2 | 3 | 4 | 5 | |
| 11 | O | O | | | | Energise OTM and OTG, resetting M and G to zeroes. |
| 12 | D | | | | | |
| 1 | D | | | | | Energise OTI, resetting I to zeroes. |
| 2 | O | | | O | O | Put 1 in G16) That is, enter instruction |
| 3 | O | | | O | | Put 1 in G14) code "five" in register G. |
| 4 | D | | | | | |
| 5 | D | | | | | |
| 6 | D | | | | | |
| 7 | | | | | O | Open GTM entering code "five" into register M. |
| 8 | O | | | | | Pulse restart line 16; the unit 1b should then open MTI, entering code "five" into register I. |
| 9 | D | | | | | |
| 10 | D | | | | | |
| 11 | O | O | | | | Energise OTM and OTG, resetting M and G. |
| 12 | O | | | | | Pulse "control stop" line 16 to initiate first action of sequence for code "five." |
| 1 | D | | | | | Enter complementary pattern 001101111111101110 into register G. |
| 2 | O | O | O | | | Meanwhile unit 1b should apply 000010000000010001 to line 11a. |
| 3 | | O | O | O | | |
| 4 | | O | O | O | | |
| 5 | | O | O | O | | |
| 6 | | O | O | O | | |
| 7 | | O | | O | | |
| 8 | | O | O | O | O | Energise WTM, resetting M to zeroes and then entering signal from line 11a into M. |
| 9 | O | | | O | O | Energise GTQ, resetting Q and then entering complementary pattern into Q. |
| 10 | O | O | O | O | | Open MTF, QTF and FTG, and energise GTA, adding signals in M and Q, resetting A and then entering sum into A. |
| 11 | | O | | | | Energise OTG, resetting G to zeroes. |
| 12 | O | | O | | | Energise fault detector FD, and pulse "control stop" line 16 to initiate second action of sequence for code "five." |

The second column of Table VI represents a length of tape having perforations at the positions shown by O's and D's. The O's represent significant perforations whereas the D's represent non-significant perforations which have no important effects and are merely used because the available tape punch has no facility for moving the tape by a single step without punching at least one hole. The notes in the third column of Table VI explain the stages of the operation. The summation of the complementary pattern from the tape and the pattern produced by the outputs of the control section should form 001111111111111111 in the register G. This is transferred to the register A and the ones are applied to the fault detector FD: the eighteenth, and seventeenth digit positions in the register A receive one signals through the switch CWS, so that the fault detector FD is not actuated if the correct control signals have been produced.

The arrangement of FIG. 7 hereinbefore described is effective and provides automatic fault detection, but it is unnecessarily slow and clumsy, mainly because the operating speed of the tape reader is limited and because of the piecemeal loading of the complementary patterns which is necessitated since the tape reader can read only five binary signals at a time. An alternative arrangement for testing the control section which is neater, simpler and quicker, but does not in its present form give automatic fault detection, will now be described with reference to FIG. 8. Parts and interconnections which are not used in, and do not affect the testing procedure, are not shown in FIG. 8 to simplify the drawing.

In FIG. 8, the timing unit 1a is shown with its normal connections to the gates of the set 1c and to the microprogramming unit 1b. The control signal outputs of the microprograrming unit 1b are all connected to the switch CWS in the test set 13, and are all disconnected from the gates 1c. The normal connection of the link 4a between the registers section 2 and the microprogramming unit 1b is not altered. The link 4b which normally carries instruction-modifying signals from the registers section 2 to the microprogramming unit 1b is broken, and is connected to a modification selector unit 81 on the side of the break nearest to the microprogramming unit 1b. The modification selector unit 81 may comprise a bank of separate switches or a multipole switch, and is a part of the test set 13.

The test set 13 also includes a test sequence controller 82 with outputs connected to inputs of the gates 1c and to the input lines 16 and 17 of the timing unit 1a, an instruction loader 83 with outputs connected to the lines 16 and 17 and to the inputs to those gates of the set 1c which control the gates OTI, WTM and MTI, and an instruction selector 84. Outputs of the switch CWS and the instruction selector 84 are connected to channels of the data input link 11a. The normal connections of the lines 7b to the registers section 2 and the gates 1c are retained. The registers section 2 is connected to the monitor display 12 by the line 20 as before. The instruction selector 84 may be a set of four switches or a four pole sixteen way switch.

In testing the control section with the arrangement of FIG. 8, the control signal outputs produced by the microprogramming unit 1 are treated as representing digits in the numbers of an instruction number series as hereinbefore explained with reference to FIG. 3. A chosen four-digit instruction code is set up on the instruction selector 84. Chosen instruction-modifying signals are set up on the modification selector 81. The instruction loader 83 is then operated to energise the lines controlling the gates OTI, WTM and MTI, and then the line 17. This transfers the chosen instruction code into the register I and prepares the microprogramming unit 1b for following the corresponding instruction path, which should cause it to produce the signals of a known instruction number series.

The test sequence controller 82 is then operated, or made operative. It produces a sequence of signals as shown in Table VII, which takes a set of the control signals from the microprogramming unit 1b through the switch CWS, enters it as an instruction number into the register M, adds it to a cumulative running total of instruction numbers which is built up in the register A, adds one to a count of the number of instruction numbers which have been added into the running total, and then causes the microprogramming unit 1b to advance to the next step of the instruction path and to produce the set of control signals belonging to the next instruction number. The sequence of signals from the test sequence controller is repeated until the chosen instruction path has been completely traversed. The operator can then compare the total displayed on the monitor 12 with a table giving the totals which ought to be obtained at various stages if the correct sequence of control signals has been produced. The count of numbers added, which is entered in the register J, helps the operator to follow the operation. The process can be repeated for any or all of the computer instruction codes and their modifications, to provide a quick check of their actions. While it is theoretically conceivable that simultaneous faults might occur which would have a complementary effect in one or more instruction number series, and they might therefore pass undetected in one test, the practical probability of this is very small, and in any case is unlikely to cause much difficulty. If and when an incorrect total is obtained, the corresponding instruction path is repeated, stopping at each step to check the running total against previously tabulated correct values. The step at which an error occurs will then be found, and the digit position of the error will indicate it closely. These techniques allow a quick and rigorous identification of any faults in the microprogramming unit 1b.

TABLE VII

Sequence for FIG. 8 controls test

Sequence controller
  outputs:                   Resulting actions
    WTM _____ Load batch of control outputs as an instruction number into register M.
    MTF, ATF, FTG,
      GTA _____ Add instruction number to running total. Transfer new total through register G into register A.
    JTF, 1TF, FTG, GTJ __ Add one to the count of instruction numbers which have been added to the total.
    Energise line 16 _____ Initiate next step of microprogramming unit 1b.

The control outputs are tested in two batches by doing the test procedure twice with the switch CWS in different positions, as hereinbefore described with reference to FIGS. 3 and 7. The allocation of control outputs to the digit positions (Table V) is preferably arranged so that the most significant digit positions are connected to the control lines which are the least frequently used, so that the instruction number totals remain within the capacity of the register A. However, since the instruction number totals have no arithmetical significance but are merely used to check the occurrence of the control signals, an end-around carry or superimposed addition of carry digits may be arranged and allowed for in preparing the tables of correct totals, if this is considered necessary or desirable in any particular application.

It should be clearly understood that the above descriptions have been given by way of example only, as following the present disclosure many alternative equivalent procedures utilising the principles of the invention may be discerned by persons skilled in the art. The procedures will require adaptation to suit the computer which is to be tested. Different coding schemes may be used and instead of those given in Tables IV and V. In the arrangements of FIGS. 3 and 7, the gate MTI may be controlled by an output from the tape reader TR via the switch MXS, and the lines MTI and OTI disconnected from the microprogramming unit 1b. Alternatively the microprogramming unit 1b may in the final tests be allowed to operate either or both of the lines OTI and MTI as it does in the normal operation of the computer; any malfunction of these lines will soon become apparent as it will affect many of the tests, and it would be unlikely for so many parts to develop faults simultaneously. The link 4b may be disconnected from the registers section 2 and connected through bistable elements (not shown) to outputs of the switch MXS, so that the tape reader TR and switch MXS may be used to apply instruction-modifying signals to the control section, thereby allowing the control section tests described with reference to FIGS. 3 and 7 to be extended to test the sequences of actions initiated by modifying instructions. The spare positions in Table IV may be allocated to some of the lines 4b for this purpose. The sequence of signals used to test the registers section and the memory section may be obtained from a punched tape in a tape reader connected to a multicontact switch similar to the switch MXS, in a similar manner to the above-described method of testing the microprogramming unit 1b. An alternative data input medium and apparatus may be used in place of the punched tape and tape reader. The tests of the registers section and the memory section may be made more rigorous by the use of more elaborate signals or patterns. For instance, if the fault detector is suitably altered, the registers section could be tested with the signals Ch1 and Ch0 instead of all ones and all zeroes. The test set 13 may be built into the computer, being constructed in a similar form to the microprogramming unit 1b, so that the testing routines are always readily available. While this implies that the test set 13 may be no more reliable than the microprogramming unit itself, this is not a serious disadvantage since any fault in the test set or in the apparatus for generating the testing programme signals will be revealed in the testing procedure as a persistent fault apparently effecting a multitude of parts of the computer, and will therefore be easily recognised. By constructing the test set in a form similar to that of the microprogramming unit it is made capable of fast operation so that the testing routines may be performed with a speed comparable with that of the computer's normal operations.

By obvious modifications, the test set may be arranged to repeat any chosen step of the testing procedure indefinitely for a period, to test for the occurrence of a suspected intermittent fault. This will permit the occurrence of the suspected intermittent fault to be confirmed or denied in a comparatively short time, whereas in most cases it is comparatively difficult and time-consuming to determine whether or not the suspected intermittent fault is actually occurring by any normal operations of the computer, since the action which is suspected to be faulty will probably only occur infrequently in any normal operations.

I claim:
1. A method of testing an electronic digital computer of the type having a control section, a registers section and a memory section and having microprogramming parts in its control section and a plurality of storage locations in its memory section, which method comprises the steps of temporarily preventing the said microprogramming parts of the said control section from exercising their normal control over the operations of the computer; testing the registers section by feeding to it a sequence of signals so as to cause the parts of the registers section to perform the actions of which they should be capable of performing in the normal operation of the computer, in a sequence such that the occurrence of any fault in the performance of the said actions will produce a distinctive output signal at a stage in the sequence depending on the location of the cause of the fault; repairing or replacing all faulty parts within the registers section then connecting the registers section to the memory section and applying a sequence of signals thereto to test storage locations of the memory section to verify their ability to receive and reproduce number signals correctly; and then re-enabling the said microprogramming parts to exercise their normal control over the computer in subsequent normal operations thereof.

2. A method for repairing a faulty electronic digital computer in which faulty parts are located by a method of testing as claimed in claim 1, in which the steps of the method are performed in the order claimed and every faulty part so located is replaced before proceeding to the next step of the method.

3. A method of testing as claimed in claim 1 and wherein said microprogramming parts are temporarily prevented from exercising their normal control over the computer by making temporary disconnections.

4. A method for repairing a faulty electronic digital computer in which faulty parts are located by a method of testing as claimed in claim 3, in which the steps of the method are preformed in the order claimed and every faulty part so located is replaced before proceeding to the next step of the method.

5. A method of testing as claimed in claim 1 and wherein the storage locations of the memory section are tested by connecting the registers section to the memory section and applying a sequence of signals to the registers section and the memory section which firstly cause the storage locations to be filled with a first pattern of one digits and zero digits, secondly cause the contents of the storage locations to be read out and checked to confirm whether the digits read out agree with the first pattern fed in, thirdly cause the storage locations to be refilled with a second pattern of one digits and zero digits which is complementary to the said first pattern, and fourthly cause the contents tof the storage locations to be again read out and checked to confirm whether the digits read out agree with the second pattern fed in.

6. A method for repairing a faulty electronic digital computer in which faulty parts are located by a method of testing as claimed in claim 5, in which the steps of the method are performed in the order claimed and every faulty part so located is replaced before proceeding to the next step of the method.

7. A method of testing a computer of a type having a registers section provided with data input lines and with instruction-modifying signal output lines which are normally connected to the control section, said method being as claimed in claim 1 and also comprising a further step wherein said instruction-modifying signal output lines are temporarily connected to data input lines of the registers section, and a sequence of signals is applied to the registers section to cause instruction-modifying signals to be set up on at least some of the instruction-modifying signal output lines and then transmitted through the data input lines to a part of the registers section where their correctness can be verified.

8. A method for repairing a faulty electronic digital computer in which faulty parts are located by a method of testing as claimed in claim 7, in which the steps of the method are performed in the order claimed and every faulty part so located is replaced before proceeding to the next step of the method.

9. A method of testing as claimed in claim 1 and in which a monitor display is arranged to display signals obtained during the test procedure, and the correctness of the signals is verified by visual inspection of the monitor display.

10. A method for repairing a faulty electronic digital computer in which faulty parts are located by a method of testing as claimed in claim 9, in which the steps of the method are performed in the order claimed and every faulty part so located is replaced before proceeding to the next step of the method.

11. A method of testing as claimed in claim 1 and in which at least one signal developed during the test procedure in a part of the computer under test is a multi-digit binary signal and is added to the complement of the correct form which it should have in the absence of any faults, and a fault indicator device is arranged to be actuated by the occurrence of a zero in the sum of the said multidigit signal and the said complement of its correct form.

12. A method for repairing a faulty electronic digital computer in which faulty parts are located by a method of testing as claimed in claim 11, in which the steps of the method are performed in the order claimed and every faulty part so located is replaced before proceeding to the next step of the method.

13. A method of testing as claimed in claim 1 and comprising further steps wherein a sequence of instruction signals is fed to the microprogramming part of the control section and the correctness of the control output signals produced by the microprogramming part in response to the said instruction signals is verified.

14. A method of testing as claimed in claim 13 and comprising further steps in which control output lines of the control section are temporarily connected to the data input lines of the registers section, a set of instruction signals is applied to the control section which should cause it to produce a given sequence of control signals on the said control output lines, the control signals actually produced thereon are transmitted through the data input lines and their correctness is verified with the aid of facilities provided in the registers section.

15. A method for reparing a faulty electronic digital computer in which faulty parts are located by a method of testing as claimed in claim 13, in which the steps of the method are performed in the order claimed and every faulty part so located is replaced before proceeding to the next step of the method.

16. A method of testing as claimed in claim 13 and comprising further steps in which control output lines from the microprogramming parts of the control section are temporarily connected to the data input lines of the registers section, a set of instruction signals is applied to the microprogramming parts of the control section which should cause them to produce on said control output lines a sequence of control signals and the control signals actually produced thereon are transmitted through the data input lines so that their correctness can be verified with the aid of facilities provided in the registers section.

17. A method of testing as claimed in claim 16 and in which sets of simultaneous signals produced on a batch of the said control output lines are cumulatively added together in the registers section to form a total, as if each set of simultaneous signals represented a multi-digit binary number in parallel form, each control output line being associated with a given digit position.

18. A method of testing as claimed in claim 8 and in which a monitor display is arranged to display signals obtained during the test procedure, and the correctness of the signals is verified by visual inspection of the monitor display.

19. A method for repairing a faulty electronic digital computer in which faulty parts are located by a method of testing as claimed in claim 17, in which the steps of the method are performed in the order claimed and every faulty part so located is replaced before proceeding to the next step of the method.

20. An apparatus for testing an electronic digital computer of the type having data input lines, an instruction register and a plurality of data registers, and a control section provided with control output lines which are normally connected to control input lines of various parts of the computer, the said apparatus comprising instruction selector means for setting up a chosen set of instruction signals for application to the instruction register of the computer, instruction loader means for producing a sequence of signals for application to the control input lines of the computer to cause the said chosen set of instruction signals to be entered in the instruction register and to make the computer responsive to the said chosen set of instruction signals, and a test sequence control means for producing a sequence of signals for application to the control input lines to cause sets of signals produced on the control output lines to be transferred through the data input lines to one of the said data registers and to cause the said sets of signals to be cumulatively added together therein as if they represented multi-digit binary numbers in parallel form.

References Cited

UNITED STATES PATENTS

| | | | |
|---|---|---|---|
| 3,237,157 | 2/1966 | Higby | 340—146.1 |
| 3,331,058 | 7/1967 | Perkins | 340—146.1 X |
| 3,343,141 | 9/1967 | Hackl | 340—146.1 X |
| 3,387,262 | 6/1968 | Ottaway | 340—146.1 |
| 3,405,258 | 10/1968 | Godoy et al. | 340—146.1 |

OTHER REFERENCES

Fred Lee: An Automatic Self-Checking and Fault-Locating Method, IRE Transactions on Elect. Computers, October 1962, pp. 649–654.

MALCOLM A. MORRISON, Primary Examiner

C. E. ATKINSON, Assistant Examiner

U.S. Cl. X.R.

340—172.5

PO-1050
(5/69)

UNITED STATES PATENT OFFICE
CERTIFICATE OF CORRECTION

Patent No. 3,519,808      Dated July 7, 1970

Inventor(s) Robert Ernest Lawder

It is certified that error appears in the above-identified patent and that said Letters Patent are hereby corrected as shown below:

Column 12, Table I, Test (v), Parts tested, "BTF" should read --NTF--. Column 13, Table II, Test (i), Test set signals, "ITG" should read --OTG--; Test (iii), Test set signals, "TM" should read --GTM--; Test (vi), Test set signals, "En1" should read --En2--. Column 16, line 13, "Moreover" should read --However--; Table IV, Position of switch MXS 2, Track 3, "gn" should read --on--. Column 20, line 25, "modifying" should read --modified--. Column 21, line 30, "preformed" should read --performed--; line 45, "tof" should read --of--.

SIGNED AND
SEALED
OCT 6 - 1970

(SEAL)
Attest:

Edward M. Fletcher, Jr.
Attesting Officer

WILLIAM E. SCHUYLER, JR.
Commissioner of Patents